United States Patent [19]

Edwards et al.

[11] Patent Number: 5,666,242
[45] Date of Patent: Sep. 9, 1997

[54] DISK DRIVE HAVING ELASTOMERIC INTERFACE IN PIVOT BEARING ASSEMBLY

[75] Inventors: John Robert Edwards, Mountain View; Jon Matthew Garbarino, San Jose, both of Calif.

[73] Assignee: Western Digital Corporation, Irvine, Calif.

[21] Appl. No.: 561,344

[22] Filed: Nov. 21, 1995

[51] Int. Cl.$^6$ .............................. G11B 5/55; F16C 27/06
[52] U.S. Cl. .............................. 360/106; 384/536
[58] Field of Search .............................. 360/106, 97.01, 360/97.02; 384/220, 236, 536; 310/51

[56] References Cited

U.S. PATENT DOCUMENTS

| | | | |
|---|---|---|---|
| 4,896,239 | 1/1990 | Ghose | 360/106 |
| 5,099,374 | 3/1992 | Ohkita et al. | 360/106 |
| 5,235,227 | 8/1993 | Fazekas | 310/51 |
| 5,416,658 | 5/1995 | Sega et al. | 360/106 |
| 5,459,627 | 10/1995 | Peter | 360/98.08 |
| 5,491,598 | 2/1996 | Stricklin et al. | 360/106 |

FOREIGN PATENT DOCUMENTS 62-51017  3/1987  Japan.

*Primary Examiner*—Stuart S. Levy
*Assistant Examiner*—William J. Klimowicz
*Attorney, Agent, or Firm*—Leo J. Young

[57] ABSTRACT

A disk drive has a base, a cover, a spindle motor mounted to the base, and a disk coupled to the spindle motor. A rotary actuator comprising a head stack assembly is coupled to the base by a pivot bearing assembly. The pivot bearing assembly provides a stationary member, a bearing, and a sleeve member for rotatably supporting the actuator. The pivot bearing assembly further provides an elastomeric interface between the stationary member and the actuator such that vibratory motion imparted to the head stack assembly is dampened by the elastomeric interface.

16 Claims, 7 Drawing Sheets

SECTION 4-4

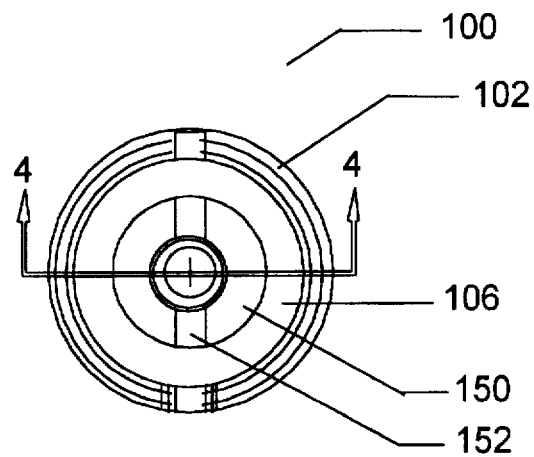
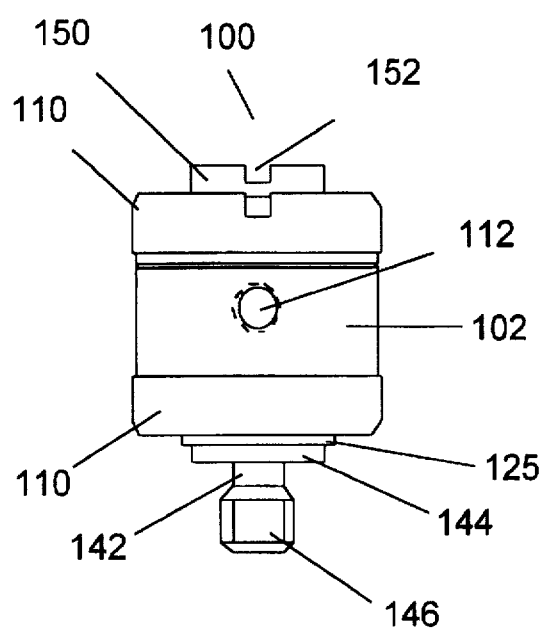
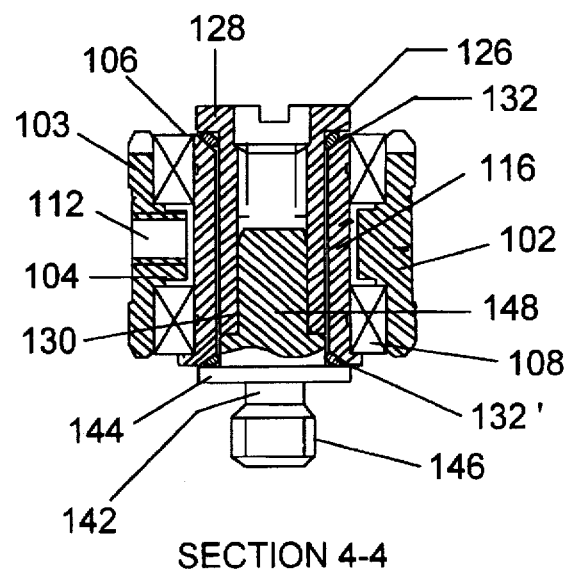

FIG. 13
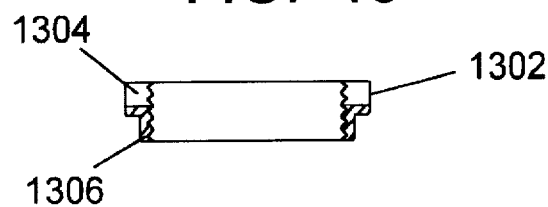
FIG. 16
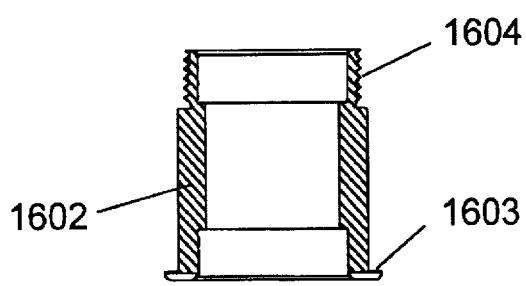
FIG. 14
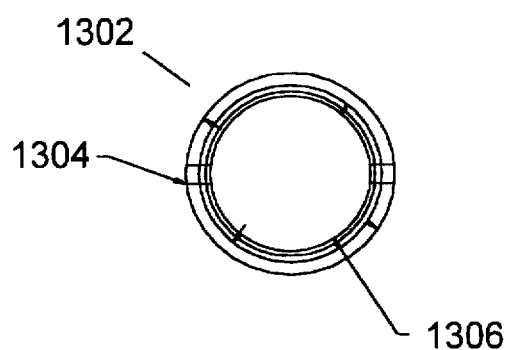
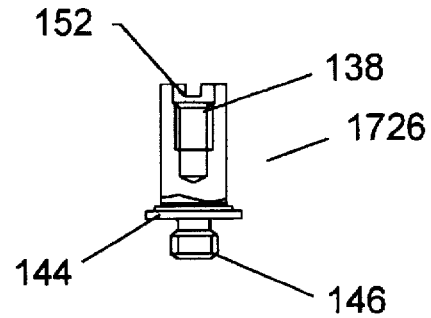
FIG. 15
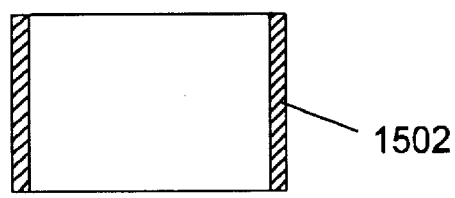
FIG. 17

5,666,242

DISK DRIVE HAVING ELASTOMERIC INTERFACE IN PIVOT BEARING ASSEMBLY

CROSS-REFERENCES TO RELATED APPLICATIONS

This application is related by subject matter to the commonly assigned U.S. Patent Application entitled "Acoustic Vibration Decoupler for a Disk Drive Pivot Bearing Assembly" [U.S. patent application Ser. No. 08/561,340], filed on even date herewith and incorporated herein by reference in its entirety.

BACKGROUND OF THE INVENTION

1. Field of the Invention

The present invention relates generally to disk drives and, more specifically, to a pivot bearing assembly having an elastomeric interface for providing vibration isolation and reducing acoustic noise levels emanating from a disk drive.

2. Description of the Related Art

Contemporary mass-produced hard disk drives employ rotary actuator structure to position transducer heads relative to recording surfaces of the disks. The rotary actuator structure includes stationary structure including a magnet assembly and rotatable structure including a pivot bearing assembly and a head stack assembly that is rotatable relative to an axis defined by the pivot bearing assembly. The head stack assembly typically comprises a body portion, a voice coil motor portion, and a set of head gimbal assemblies each carrying a transducer head for reading and writing on a magnetic disk surface.

The pivot bearing assembly typically includes a shaft and ball bearings mounted on the shaft, preloaded to reduce axial and radial play. The preload force level together with the bearings inner and outer raceway curvature, ball geometry, and fabrication materials determine the resultant axial and radial stiffness of the pivot bearing assembly. The mass and moment of inertia of the rotating parts of the pivot bearing assembly and the head stack assembly together with the pivot stiffnesses determine the frequencies of key mechanical resonant modes.

The response of the actuator structure to vibratory input is a critical element of disk drive design. Vibration can be initiated from the actuator motor as well as the motor driven spindle. Contemporary demands on disk drive performance dictate that the actuator structure have relatively low mass so as to minimize seek response time. The transducer heads must be precisely positioned by the drive's head-positioning servo system in order to read and write data recorded on the disk surface. The precision of this positioning is adversely impacted by vibration from any source, exacerbated still further by the low mass requirements. A corollary effect of the vibration is acoustic noise. The user's perception of disk drive quality may be negatively impacted by audible noise.

In prior art efforts to provide isolation of the actuator structure from induced vibration, separate damping elements have been assembled with the actuator structure attempting to provide spot damping and otherwise modify vibration response. These separate elements represent additional parts and labor, negatively impacting cost in a fiercely cost competitive product, and providing sub-optimal reduction in vibration.

Therefore, there is a need for an integrated pivot assembly which can provide damping of attached moving components from vibratory inputs to yield a disk drive which has reduced vibration with corresponding improved data transfer reliability and reduced acoustic noise.

SUMMARY OF THE INVENTION

The present invention provides a disk drive comprising a base; a cover; a disk mounted to a spindle motor; a head stack assembly comprising a body portion, a head gimbal assembly, and a coil; and a novel and advantageous pivot bearing assembly having elastomeric means to rotatably support the head stack assembly while damping vibratory inputs.

It is an advantage of the present invention that it utilizes low cost materials.

It is a further advantage of the present invention that it eliminates the need for dedicated, separate, vibration damper components, representing a piece part cost saving and the elimination of an assembly step.

It is another advantage of the present invention that it provides for more efficient manufacturing processes.

It is another advantage of the present invention that it provides for the integration of multiple functions.

It is yet another advantage of the present invention that it enhances servo track seek.

Other objects, features and advantages of the present invention will become apparent upon consideration of the following detailed description and the accompanying drawings, in which like reference designations represent like features throughout the FIGURES.

BRIEF DESCRIPTION OF THE DRAWINGS

FIG. 2 is a plan view (top) of a pivot bearing assembly in accordance with a first embodiment of the present invention.

FIG. 3 is a plan view (side) of the pivot bearing assembly in accordance with the first embodiment.

FIG. 4 is a cross-section, plan view (side) of the pivot bearing assembly in accordance with the first embodiment, the cross section being taken along the line B—B shown in FIG. 2.

FIG. 13 is a cross-section, plan view (side) of a grooved locking ring member of another alternative embodiment of the present invention.

FIG. 14 is a plan view (top) of the grooved locking ring member shown in FIG. 13.

FIG. 15 is a cross-section, plan view (side) of a sleeve member for use with the grooved locking ring member shown in FIG. 13 and FIG. 16 is a cross-section, plan view (side) of a hub member for use with the grooved locking ring member shown in FIGS. 13 and 14 and the sleeve member shown in FIG. 15.

FIG. 17 is a cross-section, plan view (side) of a base-shaft member for use with the grooved locking ring member shown in FIGS. 13 and 14, the sleeve member shown in FIG. 15, and the hub member of FIG. 16.

The drawings referred to in this description should be understood as not being drawn to scale except if specifically noted.

DETAILED DESCRIPTION OF THE INVENTION

Figure 1:
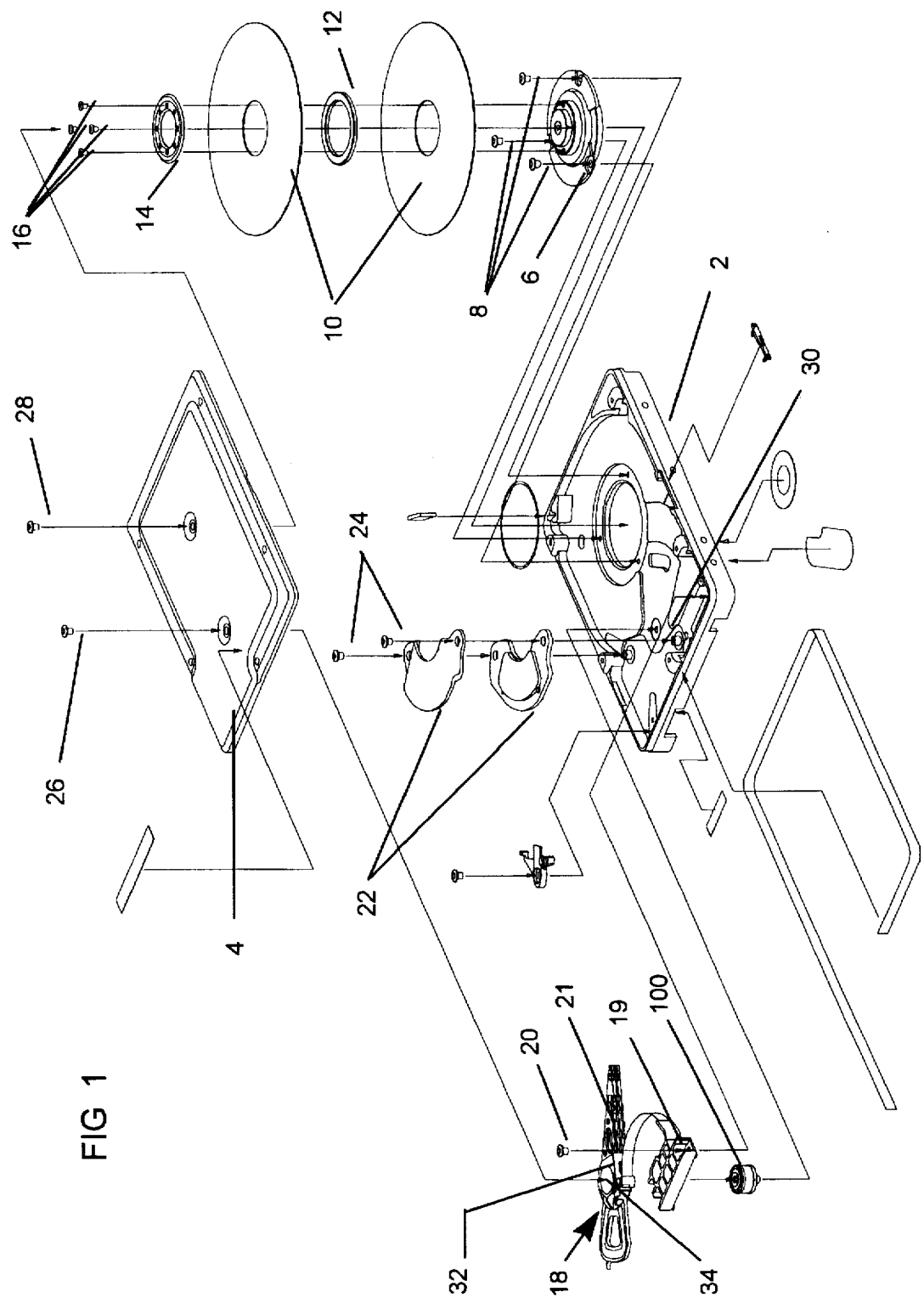
FIG. 1 is an exploded, perspective view of a disk drive in which the present invention is incorporated.

FIG. 1 shows a magnetic hard disk drive which includes a base 2 and a cover 4 that is coupled to base 2 to form a drive housing. The disk drive further includes a spindle motor assembly 6 and a set of fasteners 8 for securing motor assembly 6 to base 2. The disk drive further includes an array of storage disks 10, a storage disk spacer 12, a disk clamp 14 and fasteners 16 for securing the disk array to spindle motor assembly 6. The disk drive further includes a head stack assembly 18 including an actuator body 32 having a bore 34, a head stack electronics carrier 19, and a set of head gimbal assemblies 21. A fastener 20 secures head stack electronics carrier 19 to base 2.

The disk drive further includes a pivot bearing assembly 100, and an actuator magnet assembly 22 and fasteners 24 for securing actuator magnet assembly 22 to base 2. Two fasteners 26 and 28 are used to secure pivot bearing assembly 100 and spindle motor assembly 6, respectively, to cover 4. Appropriate electrical interconnections (not shown) and a drive controller printed circuit board assembly (not shown) for transmitting drive operational commands and data to and from the disk drive via a host computer (not shown) are provided.

Key performance factors of disk drive relate to the capability of its head-positioning servo system to maintain the active transducer head relative to a track during track-following operations, and to move the head rapidly to a settled position during track-seeking operations. The mechanical frequency response of the actuator assembly— its structural resonance behavior—affects the capability of the head-positioning servo system to perform its function. During a track SEEK operation, the motion of the actuator assembly can excite mechanical resonance and audible noise. Moreover, these mechanical resonances limit the accuracy of and the seek time required by the servo positioning system. The frequencies at which such mechanical resonances occur are determined by the overall mass and e stiffness of the combined actuator assembly and pivot device employed.

Figure 5:
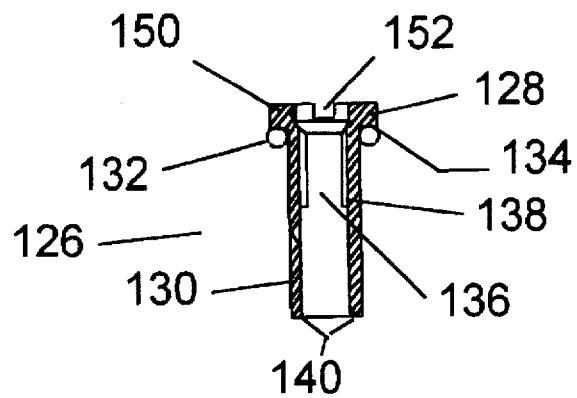
FIG. 5 is a cross-section, plan view (side) of a shaft member of the first embodiment.
Figure 6:
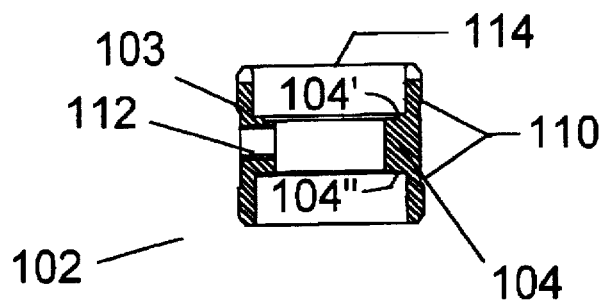
FIG. 6 is a cross-section, plan view (side) of a sleeve member of the first embodiment.
Figure 7:
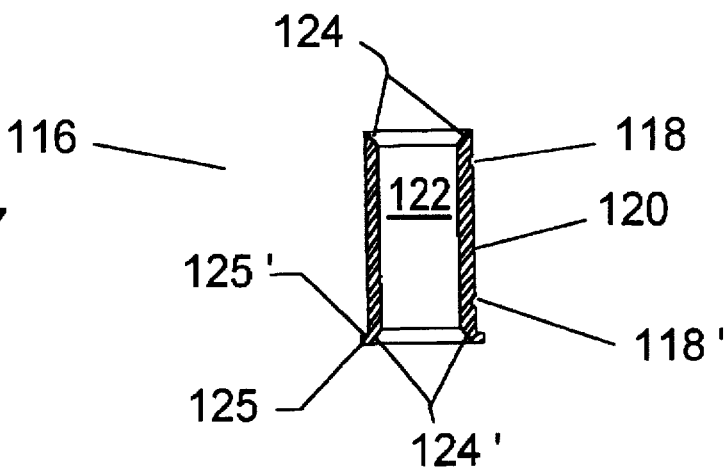
FIG. 7 is a cross-section, plan view (side) of a carrier member of the first embodiment.

FIGS. 2 through 8 show a first embodiment of pivot bearing assembly 100. An outer sleeve member 102 (FIGS. 2–4, 6) is basically a bearing case, having an internal, stepped, radial projection segment 104 (FIGS. 4 and 6). The projection segment 104, forms ledges 104', 104" (FIG. 6) for abutting an upper bearing device 106 (FIGS. 2 and 4) and lower bearing device 108 (FIG. 4) secured within sleeve member 102. Commercially available ball bearing devices, having inner and outer races, may be used in accordance with the present invention. The bearing devices 106, 108 may be affixed to the sleeve member 102 such as by the use of adhesive between the interior of the sleeve member 102 and an outer race of a ball bearing. In general, a stainless steel fabrication of the sleeve member 102 is preferred. In operation, sleeve member 102 will rotate with the outer race of each bearing device 106, 108.

The outer wall 103 of sleeve member 102 can be provided with datum features 110 (FIGS. 3 and 6) for biasing the pivot bearing assembly against the inner surface of bore 34 of actuator body 32. A threaded aperture 112 (FIG. 3, 4, 6 and 9) is not used with the invention, but is provided for attaching the pivot bearing assembly to the actuator body in applications which do not use the elastomeric interface. In fact, an advantage of this invention relies on there being defined, between the head stack assembly and the stationary structure, an interface that is solely elastomeric. A carrier member 116 (FIGS. 4 and 7) is designed to be inserted through a central bore 114 (FIG. 6) of sleeve member 102. The carrier member 116, also preferably fabricated of stainless steel, is in a loose fit between the radial projection segment 104 of the outer sleeve 102, but in a sliding fit with the inner race of each of the bearing devices 106, 108. Two grooves 118, 118' (FIG. 7 only) about the outer surface 120 of the carrier member 116 near each end provide an adhesive reservoir used for bonding the bearings inner race to the carrier.

The carrier member 116 has a central bore 122 which has bevels 124, 124', flaring the bore 122 at each end of the carrier is member 116. A bottom projecting segment 125 forms a ledge 125' for abutting the bottom bearing device 108 (FIG. 4). Thus, when assembled, the bottom bearing device 108 is captured between the carrier member bottom segment 125, ledge 125', and the sleeve member 102, bottom ledge 104" (FIG. 6) as shown in FIG. 4.

As shown in FIGS. 4 and 5, a shaft member 126 (also preferably fabricated of stainless steel), has a cap segment 128 and a barrel segment 130. The barrel segment 130 has an outer diameter to allow a loose fit within the carrier member bore 122. The cap segment 128 has a greater outer diameter than the barrel segment 130, allowing an elastomeric, compliant interface device such as a commercially available rubber (butyl, urethane, ethylene propylene, "EPDM", or the like) O-ring 132, to snugly fit about the barrel segment 130 and to ride beneath an outwardly projecting ledge 134 (FIG. 5) formed by the cap segment 128. The shaft member 126 has a bore 136 with an internally threaded region 138 (FIG. 5) at the upper end thereof. The lower extremity of the shaft member bore 136 has a 45° chamfer 140 for ease of assembly.

Figure 8:
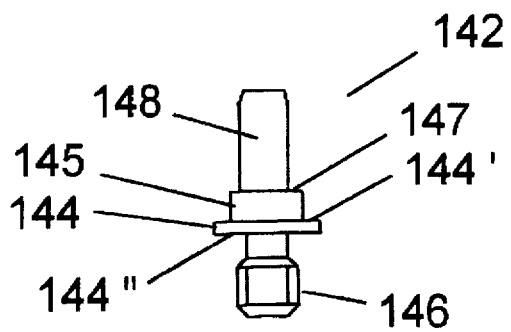
FIG. 8 is a plan view (side) of a base attachment member of the first embodiment.

As shown in FIGS. 3, 4 and 8, a base attachment member 142 (preferably fabricated of stainless steel) includes a stop plate segment 144, an attachment segment 146 descending therefrom, and a shank member 148 formed with a shoulder 145 (FIG. 8) ascending therefrom. The shank member 148 has an outer diameter such that it is snugly fit and affixed within the shaft member bore 136 as shown in FIG. 4. An O-ring 132' rides on the shoulder 145, adjacent to a top surface 144' of the stop plate segment 144. The attachment segment 146 is for affixing the base attachment member 142 to the drive housing base 2 as shown in FIG. 1. The base 2 can, for example, be provided with a receptacle, such as a threaded hole 30, for receiving a compatibly threaded attachment segment 146 therein such that the bottom 144" of the stop plate segment 144 abuts the drive housing base 2; other suitable methods for fixedly attaching the base 142 are known in the art. A shaft member head region 150 (FIGS. 2, 3 and 5) has a receiving slot 152 for a screwdriver type tool for tightening the assemblage to the housing base 2.

The assembled pivot device 100 in accordance with the present invention is shown in FIG. 4. As shown in FIG. 1, when the disk drive is assembled, a fastening device 26 secures the cover 4 to the pivot device 100—namely, by having a threaded bolt or the like screw into the threaded bore region 138 of the shaft member 126. This provides stabilization for the pivoting head stack assembly 18. Similarly, the disk motor assembly 6 can be secured to the housing cover 4 by a similar fastener 28.

In operation, the two O-rings 132, 132' are compressed between the shaft member 126 and the carrier member 116. Note carefully that the O-rings 132, 132' thus form the sole mechanical interface between the stationary structure of the pivot device 100 secured to the base and cover; comprising the combined components of the shaft member 126, the base attachment member 142, and the carrier member 116 bonded to the inner races of bearing devices 106, 108—and the rotating mechanism of the pivot device 100; that is, the sleeve member 102 and the carrier member 116 have the bearing devices 106, 108 captured therebetween such that the outer races are free to rotate while the inner races remain stationary with the shaft member 126.

As shown in FIG. 1, when head stack assembly 18 is mounted to the pivot device 100 in accordance with the present invention, an elastomeric interface is provided between the carrier 116 and the stationary mechanism of the pivot device 100, namely the shaft 126 and base attachment member 142. This elastomeric interface adds both compliance—that is a spring-like mechanism—and damping to the interface, altering the mechanical dynamic response of the actuator assembly. The design may be tailored to a predetermined, specific dynamic response by selecting the material and configuration of the elastomeric device. This in turn, enables avoidance of resonant frequencies which may cause poor servo track following and seeking performance owing to the servo system having to compensate for the position error caused by the resonance. An additional benefit is the reduction of acoustic emissions which can result in user dissatisfaction.

While the preferred embodiment has its components fabricated of stainless steel, it will be recognized by a person skilled in the art that less expensive materials, plastic or the like, can also be used.

Figure 9:
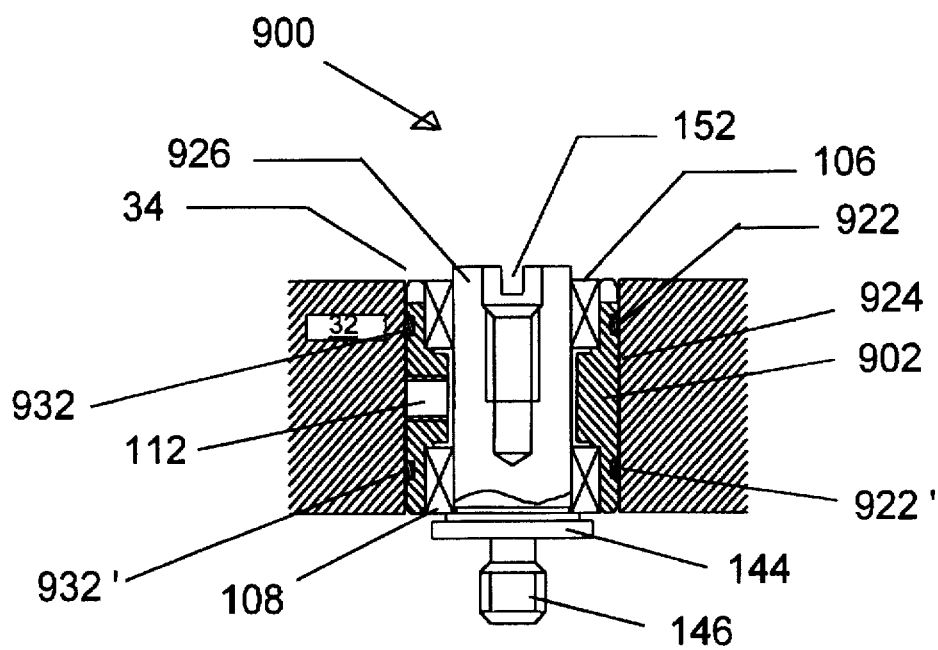
FIG. 9 is a cross-section, plan view (side) of a pivot bearing assembly within an actuator body in accordance with a second embodiment of the present invention.

FIG. 9 shows a first alternative embodiment of the present invention. A body portion 32 of head stack assembly 18 (FIG. 1) has a centrally located bore 34 adapted for receiving a pivot bearing assembly 900 in accordance with the present invention therethrough, such as in a press-fit manner. Thus, head stack assembly 18 will pivot along with the rotating mechanism components of pivot bearing assembly 900.

In this embodiment, the compliant elastomeric interface elements, such as O-rings, 932, 932' are held within grooves 922, 922' in the outer surface 924 of sleeve member 102. In this configuration, a unitary base-shaft member 926 can be adapted for use as the stationary structure. The outside diameter of pivot bearing assembly 900 is larger than the diameter of actuator bore 34 by the protrusion of the O-rings 932, 932'

During assembly, pivot bearing assembly 900 is pressed into bore 34, compressing the O-rings 932, 932'. The stiffness and damping characteristics of this elastomeric interface are determined by the size and material of the O-rings and the degree of O-ring compression. The resultant interface stiffness and damping alter the dynamic response of the overall actuator and head stack assembly 18, allowing the designer to "tune" the frequency response to avoid resonances which degrade servo tracking and acoustic performance.

Figure 10:
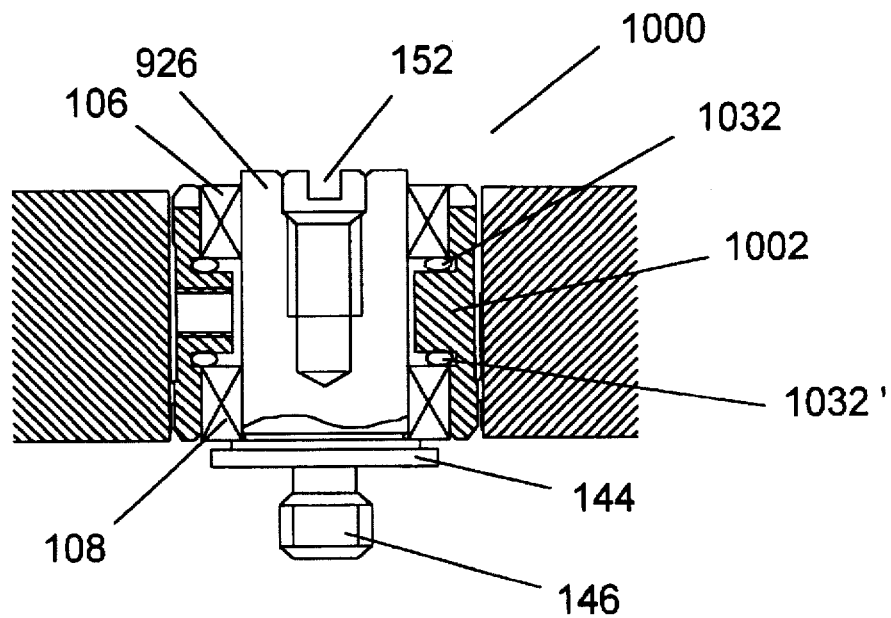
FIG. 10 is a cross-section, plan view (side) of a pivot bearing assembly within an actuator body in accordance with a third embodiment of the present invention.

Turning to FIG. 10, another embodiment of a pivot bearing assembly 1000 provides an elastomeric interface between a surface of each of the bearing devices 106, 108 and a corresponding ledge formed within sleeve member 1002 having O-rings 1032 and 1032' inserted therein.

Figure 12:
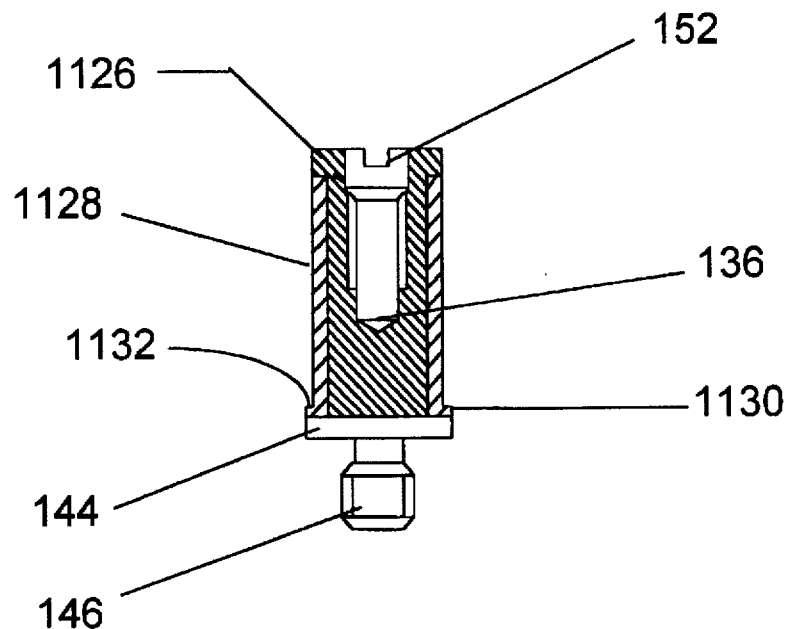
FIG. 12 is a cross-section, plan view (side) of a elastomeric covered shaft member of the fourth embodiment.
Figure 11:
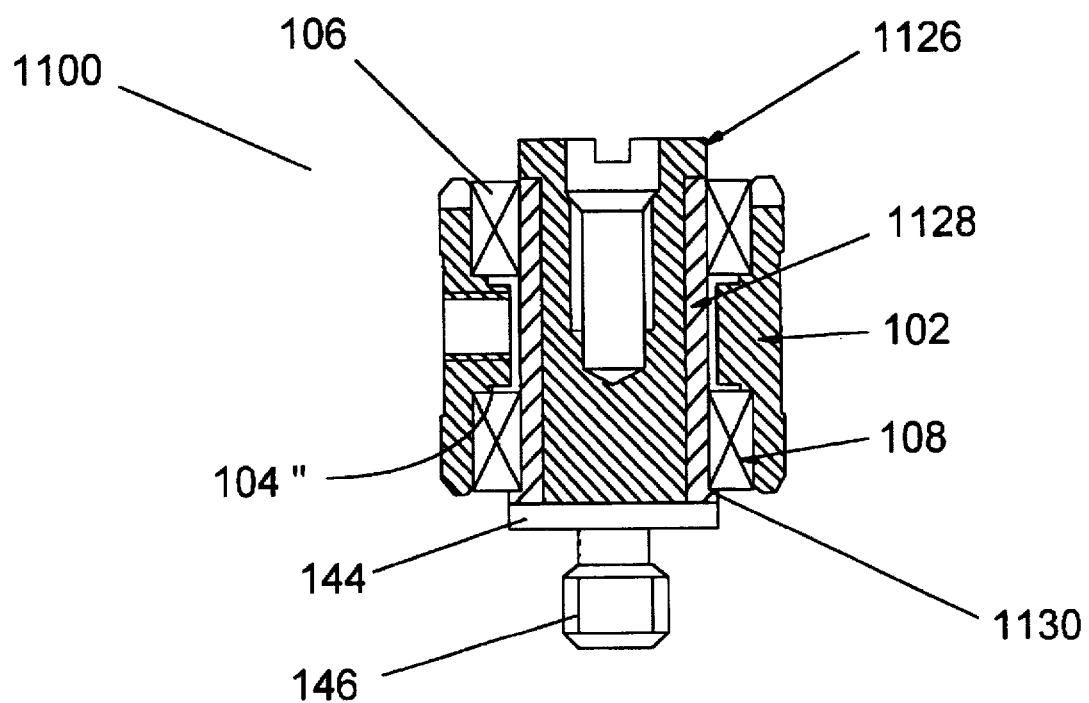
FIG. 11 is a cross-section, plan view (side) of a pivot bearing assembly in accordance with a fourth embodiment of the present invention.
Figure 18:
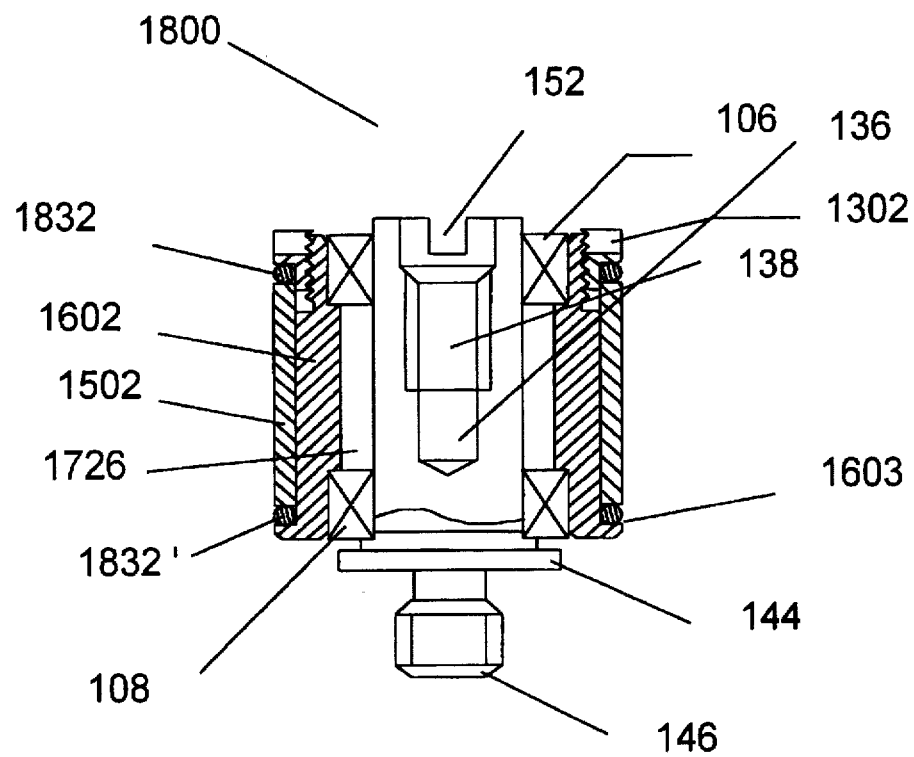
FIG. 18 is a cross-section, plan view (side) of a pivot bearing assembly incorporating the components shown in FIGS. 13 through 17.

In yet another alternative embodiment, referring to FIG. 11, a pivot bearing assembly 1100 is provided with an elastomer-covered base-shaft member 1126, as depicted alone in FIG. 12. An outer sleeve, or cover, 1128 about the periphery of base-shaft member 1126 is fabricated of the compliant elastomer material. The section of outer sleeve 1128 proximate stop plate 144 has an outwardly extending rim 1130 that forms a ledge region 1132 (FIG. 12). The lower bearing device 108 is then seated between outer sleeve ledge region 1132 and bottom ledge 104" sleeve member 102 (FIG. 12 only). Thus, the interface between the inner races of bearing devices 106, 108 and the stationary base-shaft member 1126 is entirely via the compliant elastomeric outer sleeve 1128.

Figure 19:
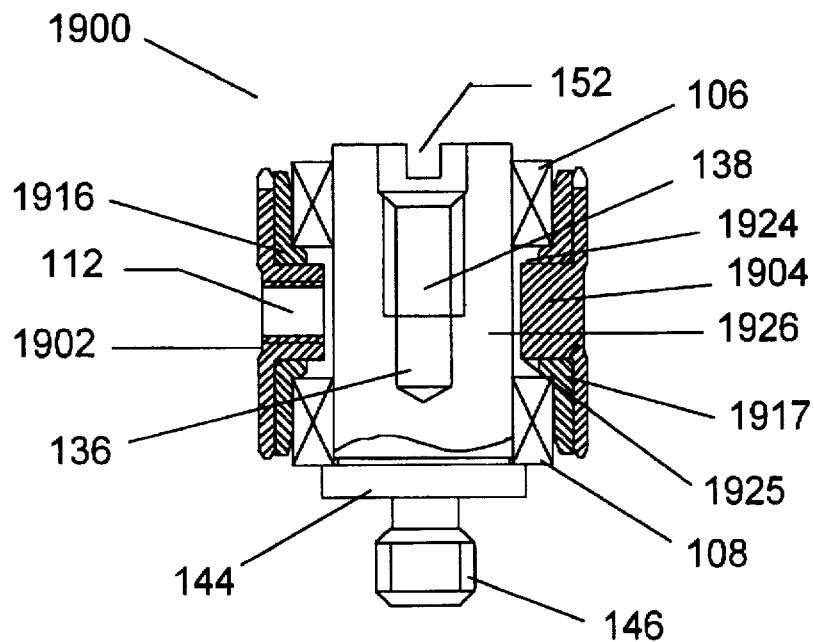
FIG. 19 is a cross-section, plan view (side) of another pivot bearing assembly in accordance with another embodiment of the present invention.

Yet a further embodiment of an elastomeric interface device 1900 in accordance with the present invention is shown in FIGURES 13 through 18. A grooved locking ring member 1302 (FIGS. 13, 14, and 18), a sleeve member 1502 (FIGS. 15 and 18), a hub member 1602 (FIGS. 16 and 18), and a base-shaft member 1726 (FIG. 17), all preferably fabricated of stainless steel, are combined with bearing devices 106, 108 and O-rings 1832, 1832' as shown in FIG. 19. Lower O-ring 1832' is captured between the s bottom ledge 1603 of the hub member and the bottom edge of the outer sleeve member 1502. Upper O-ring 1832 is captured between the cap segment 1304 of grooved locking ring 1302 and the top edge of outer sleeve member 1502. The assembly is secured by screwing the grooved locking ring 1302 onto hub member 1602 threaded portion 1604. The assembly may then be installed in the bore of the body portion. Additional turns of the locking ring compress the O-rings to form a protrusion which provides a snug fit to the bore and an elastomeric interface.

Still another alternative embodiment of the present invention is shown in FIG. 19. In this alternative embodiment, compliant elastomer portions 1916 and 1917, provide an interface between a sleeve member 1902 and the outer races of bearing devices 106, 108. The sleeve member 1902 is fabricated of a rigid material such as stainless steel and has a stepped bore, forming ledge segment 1904 with upper surface 1924 and lower surface 1925. Upper compliant elastomer portion 1916 and lower compliant elastomer portion 1917 each has an inwardly protruding segment formed to seat on upper ledge 1924 and lower ledge 1925 respectively as shown in FIG. 19. Upper bearing 106 thus abuts elastomeric portion 1916 while lower bearing 108 abuts elastomeric portion 1917. The outer sleeve member then rotates with the outer races of bearings 106 and 108 coupled through elastomeric portions 1916 and 1917.

The foregoing description shows that a variety of design implementations of a compliant elastomeric interface can be developed. The foregoing description of the preferred embodiments have been presented for purposes of illustration and description. It is not intended to be exhaustive or to limit the scope of the appended claims to the precise form disclosed. Many modifications and variations will be apparent to practitioners skilled in this art. For example, other elastomeric interface positions than those shown in the FIGURES may be selected.

We claim:

1. A disk drive comprising:

an enclosure comprising a base and a cover coupled to the base;

a disk, having a recording surface adapted for storage and retrieval for data thereon;

a spindle motor, mounted to the base and coupled to the disk;

a head stack assembly comprising a body portion having a bore, a head gimbal assembly attached to the body portion, and a coil attached to the body portion;

a pivot bearing assembly installed in the head stack assembly bore, having a sleeve member for rotatably supporting the head stack assembly and having a stationary structure affixed to the enclosure; and means for defining an elastomeric interface that provides vibration isolation, the elastomeric interface being located between the sleeve member and the stationary structure such that any vibration of the sleeve member can couple to the stationary structure only through the elastomeric interface.

2. The disk drive of claim 1, wherein the stationary structure comprises a shaft assembly, the shaft assembly further comprising:

a base attachment member for affixing the stationary structure to the base; and a shaft member for mounting the elastomeric interface defining means.

3. The disk drive of claim 1 further comprising a rotatable bearing mounted between the sleeve member and the stationary structure such that the sleeve member is freely rotatable about the stationary structure.

4. The disk drive of claim 3, wherein the elastomeric means comprise a compliant elastomeric member captured between the sleeve member and the stationary structure.

5. The disk drive of claim 4, wherein the elastomeric means further comprises a pair of O-rings.

6. The disk drive of claim 1 wherein the stationary structure comprises a unitary base-shaft member having a base attachment portion for affixing the base shaft member to the base and a shaft portion for securing the base-shaft member to the base and cover.

7. The disk drive of claim 6 wherein the elastomeric interface defining means comprise an elastomeric material covering an external portion of the base-shaft member.

8. The disk drive of claim 1 wherein the elastomeric interface defining means comprise:

the sleeve member having an interior stepped bore, the stepped bore forming an upper ledge and a lower ledge;

a first elastomeric element affixed to an upper portion of the sleeve bore adjacent the upper ledge;

a second elastomeric element affixed to a lower portion of the sleeve bore adjacent the lower ledge;

a first bearing having an inner race and an outer race, the inner race adjoining an upper portion of the stationary structure and the outer race affixed to the first elastomeric element; and a second bearing having an inner race and an outer race, the inner race adjoining a lower portion of the stationary structure and the outer race affixed to the second elastomeric element.

9. A pivot bearing assembly, for use in a disk drive having a base, a cover coupled to the base, a disk having a recording surface adapted for storage and retrieval for data thereon, a spindle motor, mounted to the base and coupled to the disk, a head stack assembly comprising a body portion having a bore, a head gimbal assembly attached to the body portion, and a coil attached to the body portion, the pivot bearing assembly further comprising:

a sleeve member for rotatably supporting the head stack assembly;

a stationary structure affixed to the base and to the cover; and means for defining an elastomeric interface that provides vibration isolation, the elastomeric interface being located between the sleeve member and the stationary structure such that any vibration of the sleeve member can couple to the stationary structure only through the elastomeric interface.

10. The pivot bearing assembly of claim 9, wherein the stationary structure comprises a shaft assembly, the shaft assembly further comprising:

a base attachment member for affixing the stationary structure to the base; and a shaft member for mounting the elastomeric interface defining means.

11. The pivot bearing assembly of claim 9 further comprising a rotatable bearing mounted between the sleeve member and the stationary structure such that the sleeve member is freely rotatable about the stationary structure.

12. The pivot bearing assembly of claim 9, wherein the elastomeric means comprises a compliant elastomeric member captured between the sleeve member and the stationary structure.

13. The pivot bearing assembly of claim 12, wherein the elastomeric means further comprises a pair of O-rings.

14. The pivot bearing assembly of claim 9, wherein the stationary structure comprises a unitary base-shaft member having a base attachment portion for affixing the base-shaft member to the base and a shaft portion for securing the base-shaft member to the base and cover.

15. The pivot bearing assembly of claim 14 wherein the elastomeric interface defining means comprise an elastomeric material covering an external portion of the base-shaft member.

16. The pivot bearing assembly of claim 9 wherein the elastomeric interface defining means comprise:

the sleeve member having an interior stepped bore, the stepped bore forming an upper ledge and a lower ledge;

a first elastomeric element affixed to an upper portion of the sleeve bore adjacent the upper ledge;

a second elastomeric element affixed to a lower portion of the sleeve bore adjacent the lower ledge;

a first bearing having an inner race and an outer race, the inner race adjoining an upper portion of the stationary structure and the outer race affixed to the first elastomeric element; and a second bearing having an inner race and an outer race, the inner race adjoining a lower portion of the stationary structure and the outer race affixed to the second elastomeric element.

* * * * *